US009811676B1

(12) United States Patent
Gauvin (10) Patent No.: US 9,811,676 B1
(45) Date of Patent: *Nov. 7, 2017

(54) SYSTEMS AND METHODS FOR SECURELY PROVIDING INFORMATION EXTERNAL TO DOCUMENTS

(71) Applicant: Symantec Corporation, Mountain View, CA (US)

(72) Inventor: William Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/006,155

(22) Filed: Jan. 26, 2016

Related U.S. Application Data

(63) Continuation of application No. 13/798,079, filed on Mar. 13, 2013.

(51) Int. Cl.
| | |
|---|---|
| *G06F 21/60* | (2013.01) |
| *G06F 21/62* | (2013.01) |
| *G06F 17/22* | (2006.01) |
| *G06F 17/30* | (2006.01) |
| *H04L 29/08* | (2006.01) |

(52) U.S. Cl.
CPC ...... *G06F 21/6209* (2013.01); *G06F 17/2288* (2013.01); *G06F 17/30076* (2013.01); *H04L 67/06* (2013.01)

(58) Field of Classification Search
CPC ... H04L 63/20; H04L 63/102; H04L 63/1416; G06F 21/60
See application file for complete search history.

(56) References Cited

U.S. PATENT DOCUMENTS

| | | | | |
|---|---|---|---|---|
| 7,233,407 | B1* | 6/2007 | Simchik | G06F 3/1206 358/1.14 |
| 2001/0033297 | A1* | 10/2001 | Shastri | G06F 21/62 715/741 |
| 2003/0115450 | A1* | 6/2003 | Smith | G06F 21/606 713/153 |
| 2007/0156598 | A1* | 7/2007 | Yoon | G06F 21/10 705/52 |
| 2010/0017880 | A1* | 1/2010 | Masood | G06F 21/51 726/24 |
| 2010/0261450 | A1* | 10/2010 | Martin-Cocher | G06Q 30/0603 455/405 |
| 2011/0107192 | A1* | 5/2011 | Ge | A61K 31/12 715/202 |
| 2012/0167206 | A1* | 6/2012 | Reetz-Lamour | G06F 21/51 726/22 |

* cited by examiner

*Primary Examiner* — Michael Pyzocha
*Assistant Examiner* — Mary Li
(74) *Attorney, Agent, or Firm* — FisherBroyles, LLP (57) ABSTRACT

A computer-implemented method for securely providing information external to documents may include identifying a document that may include at least one link to content external to the document, retrieving the content external to the document from the link, converting the content external to the document to embeddable content in a secure format that can be embedded within the document and creating a secure version of the document at least in part by embedding the embeddable content that has been converted to the secure format into the document. Various other methods, systems, and computer-readable media are also disclosed.

18 Claims, 7 Drawing Sheets

SYSTEMS AND METHODS FOR SECURELY PROVIDING INFORMATION EXTERNAL TO DOCUMENTS

CROSS REFERENCE TO RELATED APPLICATION

This application is a continuation of U.S. application Ser. No. 13/798,079, filed 13 Mar. 2013, the disclosure of which is incorporated, in its entirety, by this reference.

BACKGROUND

In an increasingly information-rich world, it becomes ever more important to have access to as much information as possible. Often this information comes in the form of hyperlinks in documents that point towards additional resources, readings, and references. But any access to external content comes with security risks, and many highly secure environments cannot tolerate the risks inherent in retrieving external content.

Traditional methods may require users to download and security check external content manually, occupying time and breaking up document flow. In other cases, users are simply left without access to vital information. Accordingly, the instant disclosure identifies and addresses a need for additional and improved systems and methods for securely providing information external to documents.

SUMMARY

As will be described in greater detail below, the instant disclosure generally relates to systems and methods for securely providing information external to documents by identifying a document with at least one link to external content, retrieving the external content, converting the external content into an embeddable, secure format and embedding the converted content into the document.

In one example, a computer-implemented method for securely providing information external to documents may include (1) identifying a document that may include at least one link to content external to the document, (2) retrieving the content external to the document from the link, (3) converting the content external to the document to embeddable content in a secure format that can be embedded within the document and (4) creating a secure version of the document at least in part by embedding the embeddable content that has been converted to the secure format into the document.

In some examples, creating the secure version of the document may include modifying the link to point to the embeddable content within the secure version of the document.

In some examples, identifying the document may include identifying a file stream including the document en route to a destination via a network gateway and may further include sending the secure version of the document to the destination via the network gateway in place of the document.

In some examples, creating the secure version of the document may be based at least in part on a content policy that may include at least one of a copyright rule that applies to the content and/or a licensing rule that applies to the content.

In some examples, converting the content external to the document to embeddable content in the secure format that can be embedded within the document may include (1) performing a security check on the link, (2) determining, based on the security check, that the link may be untrusted and (3) sanitizing, based on the link being untrusted, the content retrieved from the link.

In some examples, creating the secure version of the document may be in response to determining that the document has been sent to a restricted network environment that only allows sanitized content.

In some examples, retrieving the content external to the document from the link may include recursively retrieving additional external content from at least one additional link within the content until a predetermined depth threshold may be reached.

In some examples, creating the secure version of the document may be in response to the link within the document being disabled.

In one embodiment, a system for implementing the above-described method may include (1) an identification module programmed to identify a document that may include at least one link to content external to the document, (2) a retrieving module programmed to retrieve the content external to the document from the link, (3) a converting module programmed to convert the content external to the document to embeddable content in a secure format that can be embedded within the document, (4) a creation module programmed to create a secure version of the document at least in part by embedding the embeddable content that has been converted to the secure format into the document and (5) at least one processor configured to execute the identification module, the retrieving module, the converting module, and the creation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a document that may include at least one link to content external to the document, (2) retrieve the content external to the document from the link, (3) convert the content external to the document to embeddable content in a secure format that can be embedded within the document and (4) create a secure version of the document at least in part by embedding the embeddable content that has been converted to the secure format into the document.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for securely providing information external to documents. As will be explained in greater detail below, retrieving content external to a document and converting it to a secure, embeddable format allows for the content to be accessed in restricted network environments and reduces the security risks inherent in any use of external content.

The following will provide, with reference to FIGS. 1-2 and 4-5, detailed descriptions of exemplary systems for securely providing information external to documents. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
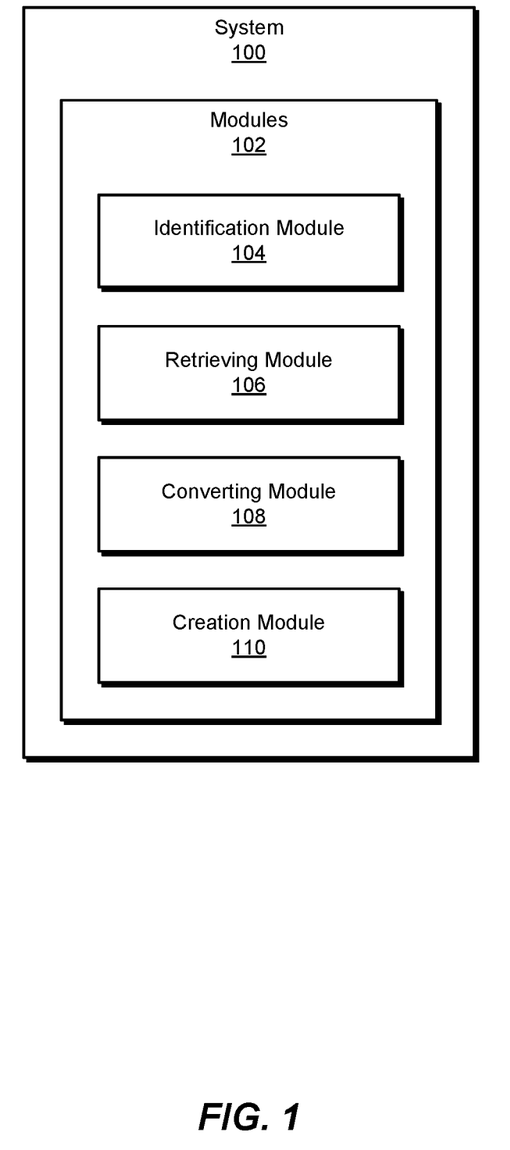
FIG. 1 is a block diagram of an exemplary system for securely providing information external to documents.

FIG. 1 is a block diagram of exemplary system 100 for securely providing information external to documents. As illustrated in this figure, exemplary system 100 may include one or more modules 102 for performing one or more tasks. For example, and as will be explained in greater detail below, exemplary system 100 may include an identification module 104 programmed to identify a document that may include at least one link to content external to the document. Exemplary system 100 may additionally include a retrieving module 106 programmed to retrieve the content external to the document from the link. Exemplary system 100 may also include a converting module 108 programmed to convert the content external to the document to embeddable content in a secure format that can be embedded within the document. Exemplary system 100 may additionally include a creation module 110 programmed to create a secure version of the document at least in part by embedding the embeddable content that has been converted to the secure format into the document. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
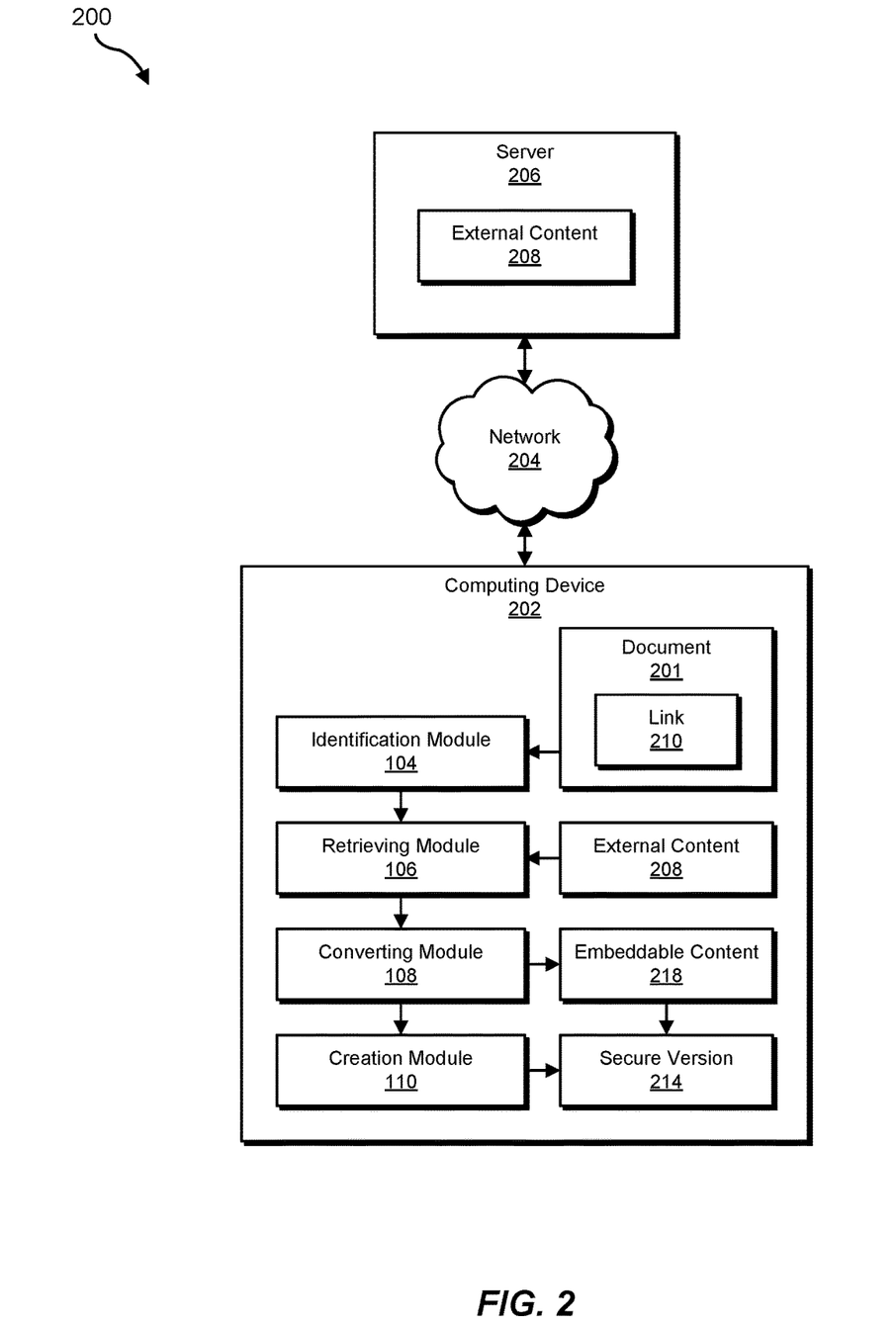
FIG. 2 is a block diagram of an exemplary system for securely providing information external to documents.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, facilitate computing device 202 and/or server 206 in securely providing information external to documents. For example, and as will be described in greater detail below, one or more of modules 102 may cause computing device 202 and/or server 206 to securely providing information external to documents. For example, and as will be described in greater detail below, identification module 104 may be programmed to identify a document 201 that may include at least one link 210 to external content 208. Retrieving module 106 may be programmed to retrieve external content 208 from link 210. Converting module 108 may be programmed to convert external content 208 to embeddable content 218 in a secure format that can be embedded within document 201. Creation module 110 may be programmed to create a secure version 214 of document 201 at least in part by embedding embeddable content 218 that has been converted to the secure format into document 201.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of sending documents. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
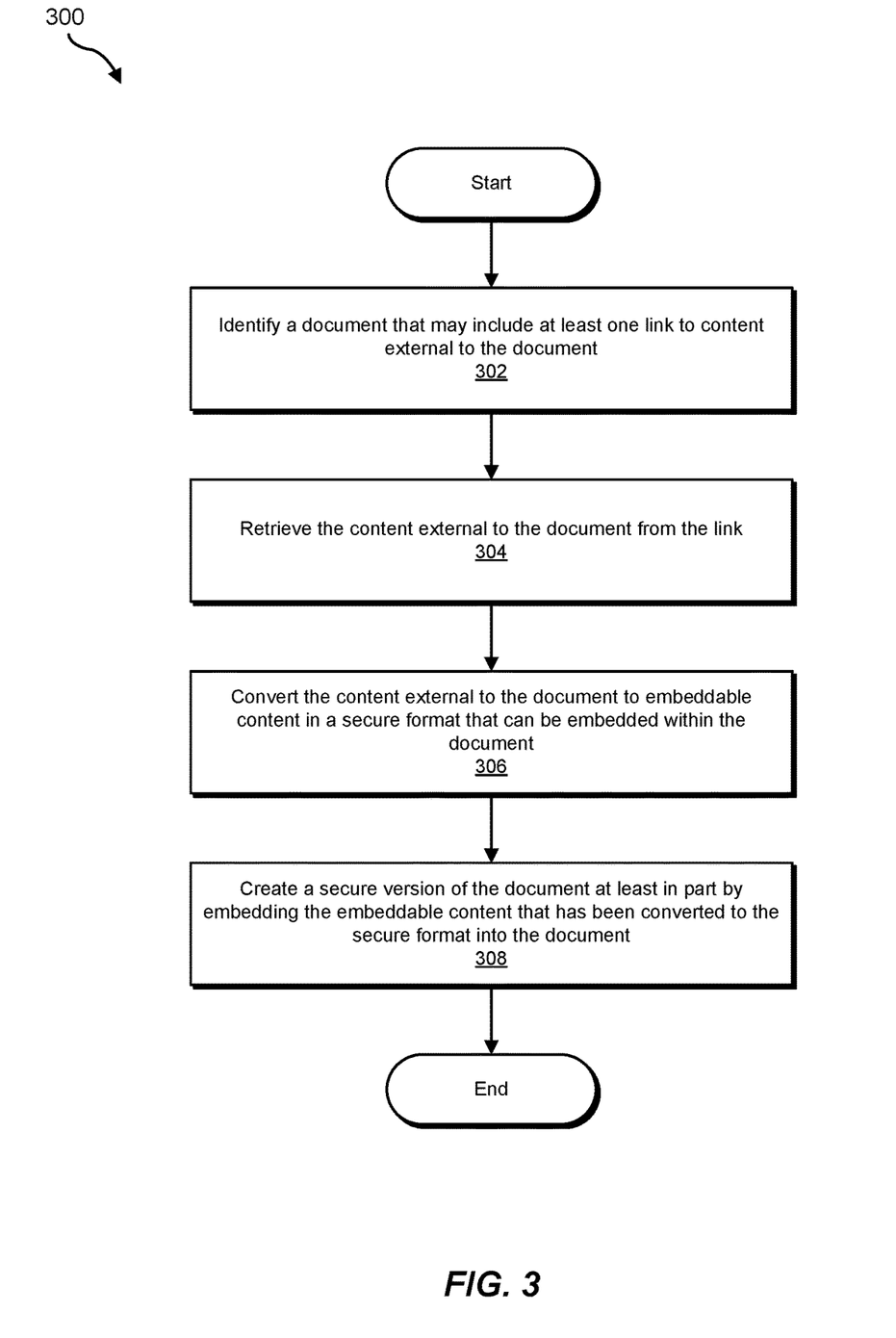
FIG. 3 is a flow diagram of an exemplary method for securely providing information external to documents.

FIG. 3 is a flow diagram of an exemplary computer-implemented method 300 for securely providing information external to documents. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a document that may include at least one link to content external to the document. For example, at step 302 identification module 104 may, as part of computing device 202 in FIG. 2, identify document 201 that may include at least one link 210 to external content 208.

Identification module 104 may identify the document in any of a variety of contexts. For example, identification module 104 may identify the document a network gateway en route to a secure network. For example, identification module 104 may identify a Portable Document Format ("PDF") file with programming examples that includes a hyperlink to a web page with further documentation of the functions used.

As used herein, the term "document" generally refers to any file containing text and/or images. Examples may include hypertext markup language web pages, PDF files, plain text files, images, and/or word processing (e.g., MICROSOFT WORD ("DOC")) files.

The term "link," as used herein, generally refers to any reference to a resource, including but not limited to hyperlinks, uniform resource locators (URLs) and/or uniform resource identifiers.

As used herein, the term "content" generally refers to any information expressible and/or embeddable in a document, including text, images, objects and/or files. Examples may include but are not limited to plain text, PDF files, text with hypertext markup language, image files, and/or text in rich text format.

At step 304 one or more of the systems described herein may retrieve the content external to the document from the link. For example, at step 304 retrieving module 106 may, as part of computing device 202 in FIG. 2, retrieve external content 208 from link 210.

For example, the network gateway may download the web page with programming documentation that may be pointed to by the hyperlink.

In some examples, retrieving module 106 may retrieve the content external to the document from the link by recursively retrieving additional external content from at least one additional link within the content until a predetermined depth threshold may be reached. For example, a web page with programming documentation may include a hyperlink to a web page with details on one of the functions used, and that web page may include a hyperlink to a web page with additional functions. In this example, retrieving module 106 may, as a part of a network gateway, download the web page with programming documentation and/or the web page with function details, but may not download the webpage with additional functions because the network gateway may have a depth threshold of two.

In some embodiments, retrieving module 106 may retrieve content only from certain links. In some examples, retrieving module 106 may only retrieve content from links that are part of a whitelist, links that are absent from a blacklist, and/or links that fall within certain licensing restrictions. For example, retrieving module 106 may only retrieve content that is marked with a General Public License.

Returning to FIG. 3, at step 306 one or more of the systems described herein may convert the content external to the document to embeddable content in a secure format that can be embedded within the document. For example, at step 306 converting module 108 may, as part of computing device 202 in FIG. 2, convert external content 208 to embeddable content 218 in a secure format that can be embedded within document 201.

Converting module 108 may convert the external content to embeddable content in any of a variety of ways. For example, converting module 108 may render the external content as an image and embed the image into the document. Additionally or alternatively, converting module 108 may strip the external content to plain text and embed the plain text into the document. In one example, converting module 108 may, as a part of a network gateway, render a web page, capture an image of the rendered web page, and embed the image within a PDF.

As used herein, the term "embedded" generally refers to content in a format which may be included within a document. For example, text, PDF document objects, and/or images may be embedded within a DOC file or a PDF file. In some examples, the external content may be embedded as a distinct object within the document. Additionally or alternatively, the external content may be embedded inline with the rest of the content in the document.

As used herein, the term "secure format" may refer to any format which may prevent malicious content from executing in a way which may harm users or systems. For example, taking a screenshot of a web page and embedding the screen shot in a PDF file may prevent any malicious JavaScript on the web page from affecting a viewer of the PDF file.

In some examples, converting module 108 may convert the content external to the document to the embeddable content by (1) performing a security check on the link, (2) determining, based on the security check, that the link may be untrusted, and (3) sanitizing, based on the link being untrusted, the content retrieved from the link.

Converting module 108 may perform the security check in any suitable manner. For example, converting module 108 may perform the security check by scanning for viruses and/or malware, checking the location of the link against a database of malicious and/or trusted locations, and/or scanning the linked content for keywords that may indicate malicious links. Converting module 108 may sanitize the content in any suitable manner. For example, converting module 108 may sanitizing the content by validating that the content meets certain standards, removing portions of content that may be malicious, and/or transforming the content into a format which my prevent malicious affects. For example, converting module 108 may, as a part of a network gateway, run a malware check on a web page, determine that the web page may include malicious JavaScript, and sanitize the content of the web page by downloading only the plain text.

At step 308 one or more of the systems described herein may create a secure version of the document at least in part by embedding the embeddable content that has been converted to the secure format into the document. For example, at step 308 creation module 110 may, as part of computing device 202 in FIG. 2, create a secure version 214 of document 201 at least in part by embedding embeddable content 218 that has been converted to the secure format into document 201.

Creation module 110 may create the secure version of the document in any suitable manner. For example, creation module 110 may replace the link within the document with the embeddable content. Alternatively, creation module 110 may insert the embeddable content in the document and modify the link to point to the embeddable content. In one example, creation module 110 may, as a part of a script on the network gateway, regenerate the PDF file to include the original content and the screenshot of the web page with programming documentation.

Figure 4:
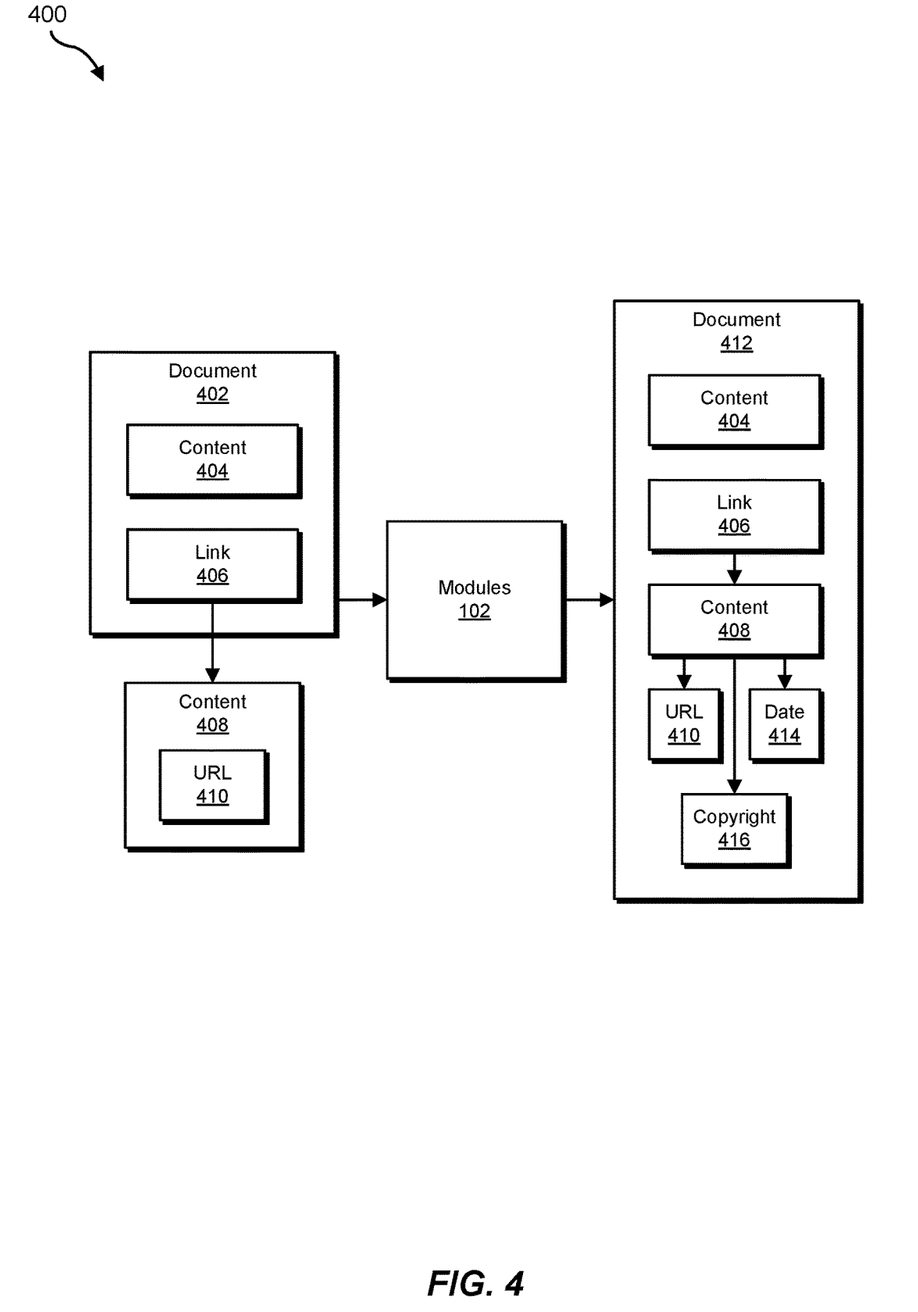
FIG. 4 is a block diagram of an exemplary system for securely providing information external to documents.

FIG. 4 is a block diagram of an exemplary computing system 400 for securely providing information external to documents. Document 402 may include content 404 and a link 406 to content 408, which may be located at URL 410. Modules 102 may identify document 402, retrieve content 408 from link 406, convert content 408 into content a secure format, and create document 412. Document 412 may include content 404, link 406, content 408, URL 410, date 414, and/or copyright 416.

In some embodiments, creation module 110 may create the secure version of the document by modifying the link to point to the embeddable content within the secure version of the document. For example, link 406 as it appears in document 412 may have been modified to point to the instance of content 408 that may be embedded in document 412. In one example, creation module 110 may modify a PDF including a link to a web page such that the link points to the embedded screenshot of the web page.

In some embodiments, creation module 110 may embed the embeddable content that may have been converted to the secure format into the document by adding into the document at least one of a uniform resource locator from which the content was retrieved and/or a date when the content was retrieved. In some examples, creation module 110 may also embed additional information, including but not limited to the copyright which applies to the content, the license which applies to the content, and/or the title of the website from which the content was retrieved. For example, content 408 in document 412 may include URL 410 from which content 408 was retrieved, date 414 on which content 408 was retrieved, and copyright 416 which applies to content 408. In one example, a screenshot of a website embedded in a PDF may include the URL of the website, the name of the company responsible for producing the content, and/or a timestamp of when the screenshot was taken.

In some embodiments, creation module 110 may create the secure version of the document based at least in part on a content policy including at least one of a copyright rule that applies to the content and/or a licensing rule that applies to the content. For example, the content may be an article which may include text which may fall under the General Public License and images which may be copyrighted. Creation module 110 may include the text of the article but not the copyrighted images from the article when creating the secure version of the document.

In some examples, creation module 110 may create the secure version of the document in response to the link within the document being disabled. For example, the document may be a PDF under the effect of a security policy that disables hyperlinks.

In some embodiments, creation module 110 may create the secure version of the document in the background and send a message to a user when the secure version of the document may be available. The message to the user may include the secure version itself and/or a reference to where the secure version may be obtained. In some examples, creation module 110 may create the secure version of the document in the background because the document includes many links, because the external content includes many links, and/or because the external content may be large in size.

Figure 5:
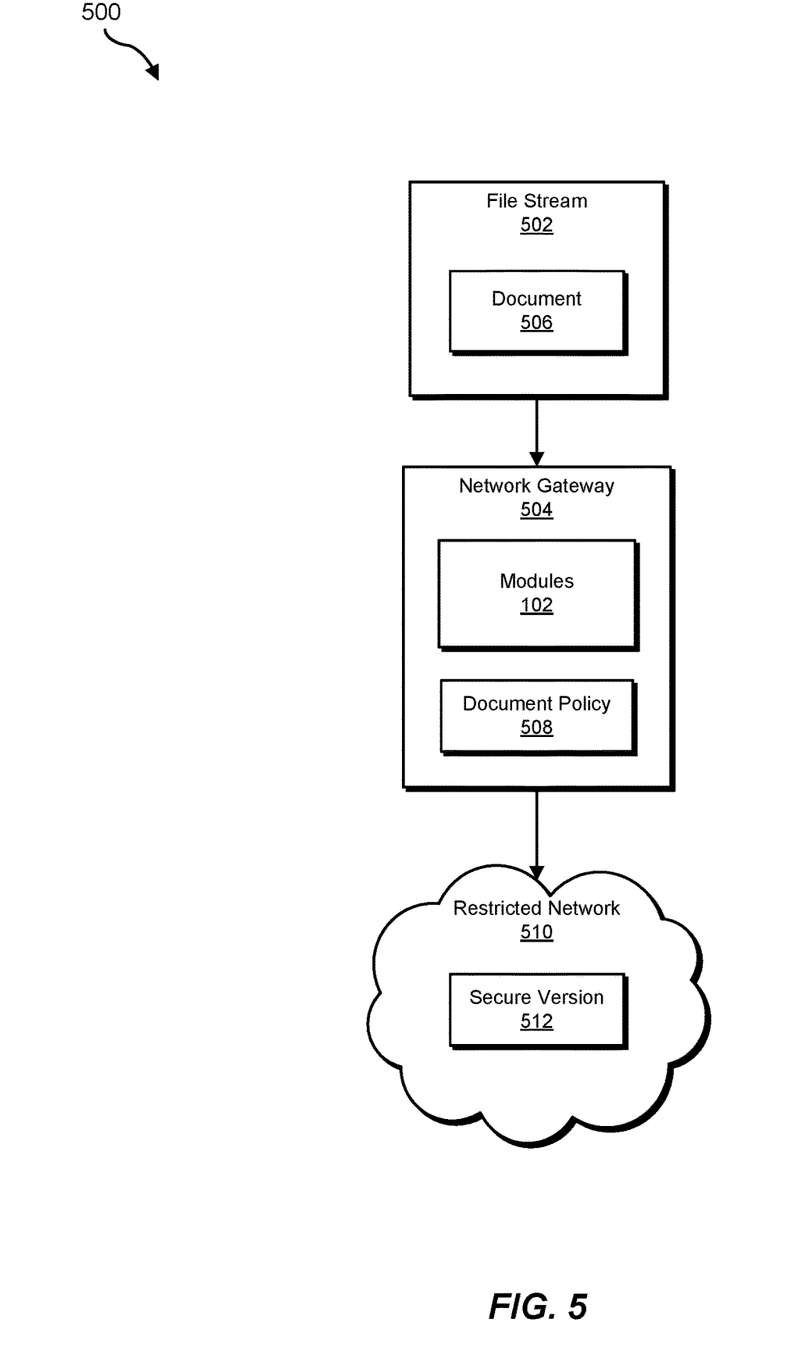
FIG. 5 is a block diagram of an exemplary system for securely providing information external to documents.

FIG. 5 is a block diagram of an exemplary computing system 500 for securely providing information external to documents. File stream 502 may include document 506 and/or may be intercepted by network gateway 504. Network gateway 504 may include modules 102 and/or document policy 508. Modules 102 may create secure version 512 of document 506, which may be sent to restricted network 510.

File stream 502 may represent a hypertext transfer protocol session, a file transfer protocol session, an email, and/or any other means of transferring files.

In some embodiments, identification module 104 identifying the document may include identifying a file stream including the document en route to a destination via a network gateway, and/or may include sending the secure version of the document to the destination via the network gateway in place of the document. For example, identification module 104 may be part of modules 102 on network gateway 504, and may identify document 506 in file stream 502. Network gateway 504 may send secure version 512 of document 506. In one example, a user on a restricted network may download an insecure PDF including a link to the web page. The network gateway on the restricted network may intercept the file stream including the download and may embed content from the linked web page into the PDF to create a secure version of the PDF. The network gateway may then send the secure version of the PDF to the user in place of the insecure PDF.

Network gateway 504 may also include a document policy. In some examples this may be a security policy and/or a licensing policy that may apply to content retrieved from links. Network gateway 504 may also include a file typer that may be used to recognize document files to which the security policy may be relevant. For example, the network gateway may use the file typer to recognize PDF files which require anti-virus scanning due to the security policy on the network gateway.

In some embodiments, creating the secure version of the document may be in response to determining that the document has been sent to a restricted network environment that may only allow sanitized content. For example, restricted network 510 may not allow documents with active hyperlinks. Secure version 512 may have had at least one link modified to point to an embedded representations of content retrieved from the link. In some examples, restricted network 510 may not be connected to the Internet and unsanitized content may be completely unavailable.

As explained above in connection with method 300 in FIG. 3, a computing device which may be a network gateway may identify a document which may be subject to a document policy and which may include at least one link to external content. The computing device may retrieve the external content, which may include recursively retrieving further external content from links within the original external content.

The computing device may convert the external content into a format which may be secure and which may be embedded within the document. The computing device may create a secure version of the document at least in part by embedding the reformatted external content. The secure version may also include further information about the external content, such as the date on which the external content was retrieved, the source from which the external content was retrieved, and/or copyright and/or licensing information pertaining to the external content. If the computing device is a network gateway, it may also send the secure version of the document in place of the original document.

Creating the secure version of the document with the external content embedded may allow the external content to be securely accessed from restricted network environments and/or local networks which are not connected to the Internet. This may enable users access to vital information which would otherwise be unavailable in a highly secure environment.

Figure 6:
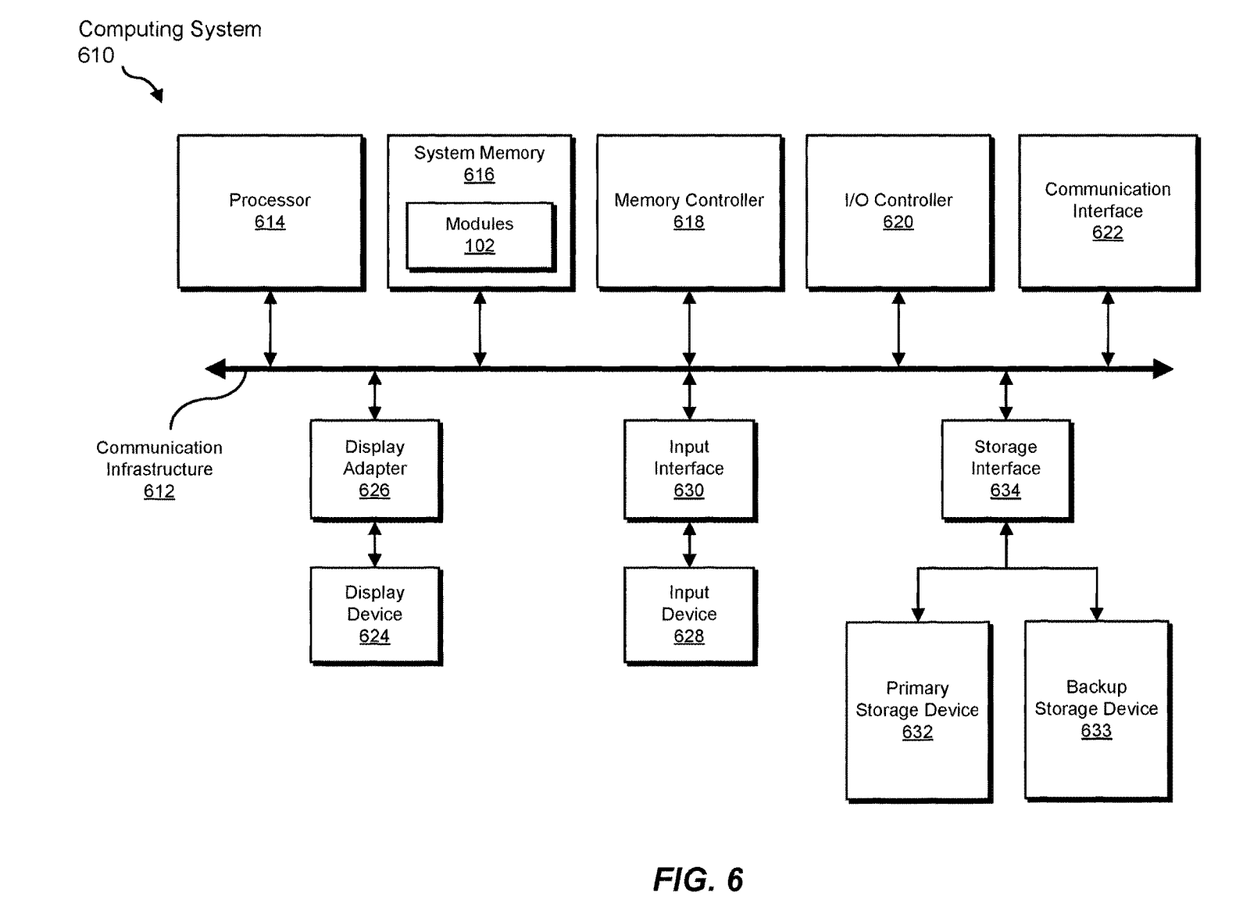
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, retrieving, converting and/or creating steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
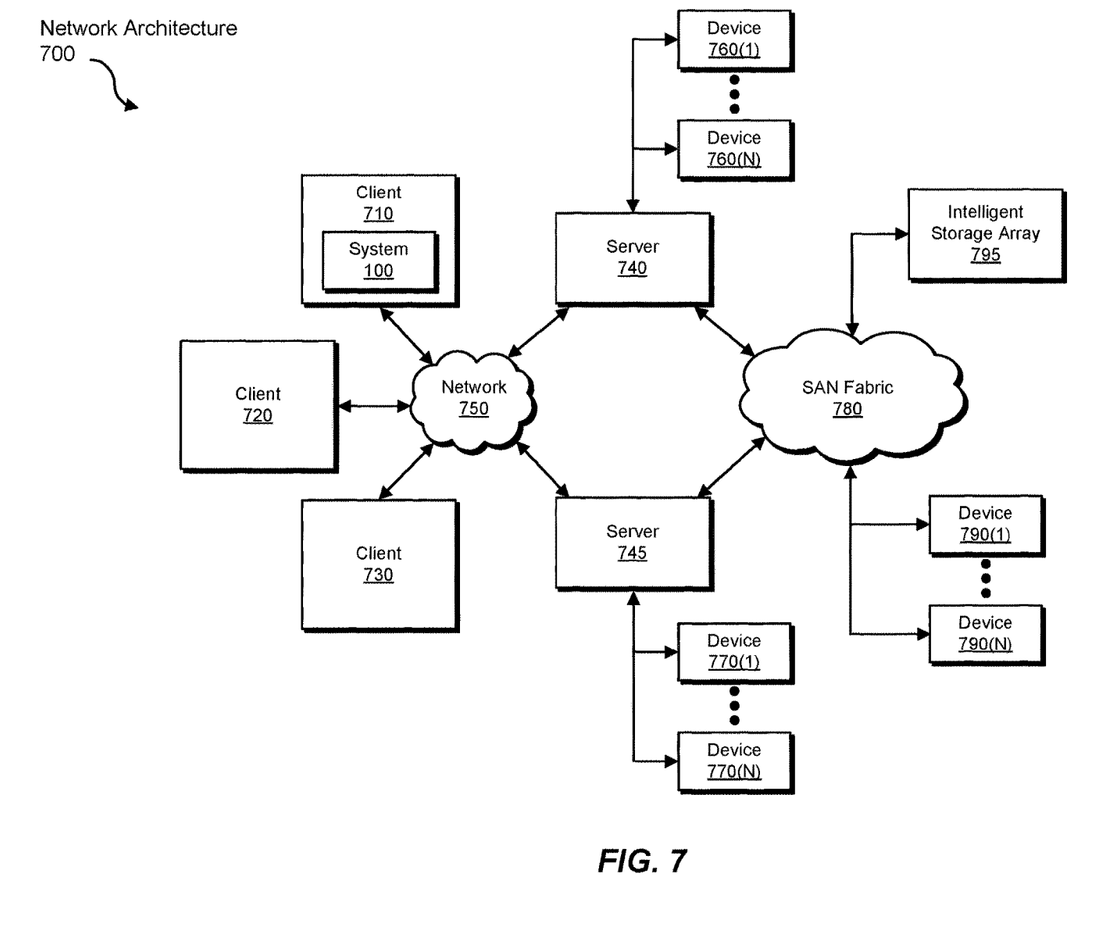
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, retrieving, converting and/or creating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for securely providing information external to documents.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive content to be transformed, transform the content, output a result of the transformation to a network gateway, use the result of the transformation to create a secure version of the document, and store the result of the transformation to a computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securely providing information external to documents, at least a portion of the method being performed by a computing device comprising at least one processor, the method comprising:
    identifying an original version of a requested file comprising at least one link to content external to the requested file;
    retrieving, prior to delivering the requested file, the content external to the requested file from the link;
    converting, prior to delivering the requested file, the content external to the requested file to embeddable content in a secure format that can be embedded within the requested file;
    creating, prior to delivering the requested file, a secure version of the requested file at least in part by embedding the embeddable content that has been converted to the secure format into the requested file, thereby providing secure access to the content external to the requested file via the requested file rather than via a reference to data stored outside the requested file, wherein creating the secure version of the requested file comprises modifying the link to point to the embeddable content within the secure version of the requested file;
    delivering the secure version of the requested file instead of the original version of the requested file.

2. The computer-implemented method of claim 1,
    wherein identifying the requested file comprises identifying a file stream comprising the requested file en route to a destination via a network gateway;
    further comprising sending the secure version of the requested file to the destination via the network gateway in place of the requested file.

3. The computer-implemented method of claim 1, wherein creating the secure version of the requested file is based at least in part on a content policy comprising at least one of:
    a copyright rule that applies to the content;
    a licensing rule that applies to the content.

4. The computer-implemented method of claim 1, wherein converting the content external to the requested file to embeddable content in the secure format that can be embedded within the requested file comprises:
    performing a security check on the link;
    determining, based on the security check, that the link is untrusted;
    sanitizing, based on the link being untrusted, the content retrieved from the link.

5. The computer-implemented method of claim 1, wherein creating the secure version of the requested file is in response to determining that the requested file has been sent to a restricted network environment that only allows sanitized content.

6. The computer-implemented method of claim 1, wherein retrieving the content external to the requested file from the link comprises recursively retrieving additional external content from at least one additional link within the content until a predetermined depth threshold is reached.

7. The computer-implemented method of claim 6, wherein:
    converting the content external to the requested file to embeddable content comprises converting the additional external content into secure additional embeddable content;
    embedding the embeddable content comprises storing the secure additional embeddable content within the requested file.

8. The computer-implemented method of claim 1, wherein creating the secure version of the requested file is in response to the link within the requested file being disabled.

9. The computer-implemented method of claim 1, wherein embedding the embeddable content that has been converted to the secure format into the requested file comprises adding into the requested file at least one of:
    a uniform resource locator from which the content was retrieved;
    a date when the content was retrieved.

10. A system for securely providing information external to documents, the system comprising:
    an identification module, stored in memory, that identifies an original version of a requested file comprising at least one link to content external to the requested file;
    a retrieving module, stored in memory, that retrieves, prior to delivering the requested file, the content external to the requested file from the link;
    a converting module, stored in memory, that coverts, prior to delivering the requested file, the content external to the requested file to embeddable content in a secure format that can be embedded within the requested file;
    a creation module, stored in memory, that:
        creates, prior to delivering the requested file, a secure version of the requested file at least in part by embedding the embeddable content that has been converted to the secure format into the requested file, thereby providing secure access to the content external to the requested file via the requested file rather than via a reference to data stored outside the requested file, wherein creating the secure version of the requested file comprises modifying the link to point to the embeddable content within the secure version of the requested file;
        delivers the secure version of the requested file instead of the original version of the requested file;
    at least one processor configured to execute the identification module, the retrieving module, the converting module and the creation module.

11. The system of claim 10,
    wherein the identification module is programmed to identify the requested file by identifying a file stream comprising the requested file en route to a destination via a network gateway;
    further comprising a sending module programmed to send the secure version of the requested file to the destination via the network gateway in place of the requested file.

12. The system of claim 10, wherein the creation module is programmed to create the secure version of the requested file based at least in part on a content policy comprising at least one of:
    a copyright rule that applies to the content;
    a licensing rule that applies to the content.

13. The system of claim 10, wherein the converting module is programmed to convert the content external to the requested file to embeddable content in the secure format that can be embedded within the requested file by:
    performing a security check on the link;

determining, based on the security check, that the link is untrusted;
sanitizing, based on the link being untrusted, the content retrieved from the link.

14. The system of claim 10, wherein the creation module is programmed to create the secure version of the requested file in response to determining that the requested file has been sent to a restricted network environment that only allows sanitized content.

15. The system of claim 10, wherein the retrieving module is programmed to retrieve the content external to the requested file from the link by recursively retrieving additional external content from at least one additional link within the content until a predetermined depth threshold is reached.

16. The system of claim 10, wherein the creation module is programmed to create the secure version of the requested file in response to the link within the requested file being disabled.

17. The system of claim 10, wherein an embedding module programmed to embed the embeddable content that has been converted to the secure format into the requested file by adding into the requested file at least one of:
a uniform resource locator from which the content was retrieved;
a date when the content was retrieved.

18. A non-transitory computer-readable-storage medium comprising one or more computer-readable instructions that, when executed by at least one processor of a computing device, cause the computing device to:
identify an original version of a requested file comprising at least one link to content external to the requested file;
retrieve, prior to delivering the requested file, the content external to the requested file from the link;
convert, prior to delivering the requested file, the content external to the requested file to embeddable content in a secure format that can be embedded within the requested file;
create, prior to delivering the requested file, a secure version of the requested file at least in part by embedding the embeddable content that has been converted to the secure format into the requested file, thereby providing secure access to the content external to the requested file via the requested file rather than via a reference to data stored outside the requested file, wherein creating the secure version of the requested file comprises modifying the link to point to the embeddable content within the secure version of the requested file;
deliver the secure version of the requested file instead of the original version of the requested file.

* * * * *